(12) United States Patent
Guemmer

(10) Patent No.: US 10,113,430 B2
(45) Date of Patent: Oct. 30, 2018

(54) GROUP OF BLADE ROWS

(71) Applicant: Rolls-Royce Deutschland Ltd & Co KG, Blankenfelde-Mahlow (DE)

(72) Inventor: Volker Guemmer, Mahlow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 772 days.

(21) Appl. No.: 14/626,594

(22) Filed: Feb. 19, 2015

(65) Prior Publication Data

US 2015/0240646 A1    Aug. 27, 2015

(30) Foreign Application Priority Data

Feb. 27, 2014   (DE) .......................... 10 2014 203 604

(51) Int. Cl.
  *F01D 5/06*   (2006.01)
  *F01D 5/14*   (2006.01)
  (Continued)

(52) U.S. Cl.
  CPC ............. *F01D 5/142* (2013.01); *F01D 5/06* (2013.01); *F01D 5/146* (2013.01); *F01D 9/041* (2013.01);
  (Continued)

(58) Field of Classification Search
  CPC . F01D 5/14; F01D 5/142; F01D 5/146; F04D 29/181; F04D 29/324; F04D 29/541; F04D 29/544
  See application file for complete search history.

(56) References Cited

U.S. PATENT DOCUMENTS 3,937,592 A    2/1976  Bammert
6,554,564 B1 *  4/2003  Lord ..................... F01D 5/141
                                                      415/119
(Continued)

FOREIGN PATENT DOCUMENTS

DE         3924829     2/1991
DE     102007035726   2/2009
(Continued)

OTHER PUBLICATIONS

German Search Report dated Mar. 26, 2014 from counterpart German App No. 10 2014 203 604.6.
(Continued)

*Primary Examiner* — Logan Kraft
*Assistant Examiner* — Christopher R Legendre
(74) *Attorney, Agent, or Firm* — Shuttleworth & Ingersoll, PLC; Timothy J. Klima

(57) ABSTRACT

The present invention relates to a blade row group arrangeable in a main flow path of a fluid-flow machine and including N adjacent member blade rows firmly arranged relative to one another in both the meridional direction (m) and the circumferential direction (u), with the number N of the member blade rows being greater than/equal to 2 and (i) designating the running index with values between 1 and N. Here, a front member blade row with front blades (i) having a leading edge and a trailing edge as well as a rear member blade row with rear blades (i+1) having a leading edge and a trailing edge are provided.

18 Claims, 8 Drawing Sheets

(51) Int. Cl.
    *F01D 9/04*     (2006.01)
    *F04D 19/00*    (2006.01)
    *F04D 29/32*    (2006.01)
    *F04D 29/54*    (2006.01)

(52) U.S. Cl.
    CPC ......... *F04D 19/002* (2013.01); *F04D 29/324* (2013.01); *F04D 29/544* (2013.01); *F05D 2240/40* (2013.01); *F05D 2270/17* (2013.01); *Y02T 50/673* (2013.01)

(56) References Cited

U.S. PATENT DOCUMENTS

| | | | |
|---|---|---|---|
| 8,534,997 | B2 | 9/2013 | Guemmer |
| 9,303,513 | B2 * | 4/2016 | Gomez ............... F01D 1/04 |
| 9,453,423 | B2 | 9/2016 | Gomez |
| 2010/0303629 | A1 * | 12/2010 | Guemmer ............ F01D 5/146 |
| | | | 416/223 R |
| 2013/0209223 | A1 | 8/2013 | Gomez et al. |
| 2013/0209224 | A1 | 8/2013 | Gomez |
| 2013/0209241 | A1 | 8/2013 | Gomez et al. |
| 2013/0209259 | A1 | 8/2013 | Gomez et al. |
| 2014/0328675 | A1 * | 11/2014 | Derclaye ............ F01D 5/142 |
| | | | 415/194 |
| 2015/0240646 | A1 * | 8/2015 | Guemmer ........... F01D 5/142 |
| | | | 416/201 R |
| 2017/0030375 | A1 * | 2/2017 | Shibata .............. F04D 19/02 |

FOREIGN PATENT DOCUMENTS

| | | |
|---|---|---|
| EP | 2261463 | 12/2010 |
| EP | 2626512 A1 | 8/2013 |
| EP | 2626513 A1 | 8/2013 |
| EP | 2626514 A1 | 8/2013 |
| GB | 2235734 | 3/1991 |
| WO | 2005040559 | 5/2005 |

OTHER PUBLICATIONS

European Search Report dated Jul. 23, 2015 from counterpart European App No. 15156108.1.
Willy J. G. Braunling, Aircraft Engines, ISBN 978-3-540-76368-0, Springer, pp. 604, 643, 967, 968 [See attached concise statement of relevance].

* cited by examiner

GROUP OF BLADE ROWS

CROSS-REFERENCE TO RELATED APPLICATION

This application claims priority to German Patent Application No. 10 2014 203 604.6 filed on Feb. 27, 2014, the entirety of which is incorporated by reference herein.

BACKGROUND

This invention relates to a blade row group.

The aerodynamic loadability and the efficiency of fluid-flow machines, in particular blowers, compressors, turbines, pumps and fans, is limited by the growth and the separation of boundary layers near and on the hub and casing walls. To remedy this problem in the case of high aerodynamic loading and important boundary layer growth on the annulus duct side walls (hub or casing), the state of the art provides solutions only to a limited extent.

State of the art in fluid-flow machines are arrangements with double-row stator wheels, usually employed as exit stator wheels in compressors, or also double-row rotor arrangements in which directly adjacent rotors operate counter-rotatingly, or in which two directly adjacent rotor blade rows are attached to a common drum. A fluid-flow machine of this type is known for example from EP 2 261 463 A2. With these arrangements, and in particular with those having several, directly adjacent blade rows firmly arranged relative to one another (for example several rotor blade rows on the same drum, or several stator vane rows), severe boundary layer separation occurs at higher aerodynamic loading in the boundary zone of the main flow path, i.e. at the hub or casing contour.

The problems in the edge areas are primarily due to the fact that the favourable arrangement of two adjacent blade edges of a blade row group in the center of the main flow path has an unfavourable effect in the vicinity of the flow path boundary. Also, design rules known from individual blade rows are not applicable. New rules must be devised for blade row groups. In particular, the required flow deflection may quickly be so high either in parts of the blade height or along the entire blade height that the conventional arrangement of a blade row group leads to a separated boundary layer flow in the edge areas of the main flow path on the hub and/or the casing walls.

It is known from US 2013/0209223 A1 to vary the meridional overlap between front and rear blades of a blade row group between the center of the main flow path and the main flow path boundary. From US 2013/0209224 A1 it is known to vary the degree of overlap between front and rear blades of a blade row group as well as the distance of adjacent edges of the front and rear blades between the center of the main flow path and the main flow path boundary.

A variation of the overlap and of the distance is usually obtained with every configuration of a blade row group, without this necessarily having an advantageous effect on the flow. US 2013/0209223 A1 and US 2013/0209224 A1 describe most different possibilities for variation, without using aerodynamically significant parameters. Technical teachings relating to stipulation of the profile depths and the precise shape for all blade edges of two adjacent member blade rows are not provided either, although these are of crucial importance for favourably influencing the overall flow behaviour. US 2013/0209223 A1 deals with the edge spacing of adjacent member blade rows in the meridional plane (machine side view). The flow direction in blade rows has however a sometimes considerable flow swirl component, so that the blading may be considerably inclined relative to the meridional direction. Crucial for the aerodynamic behaviour, however, is a fixing of the blade edges in a view perpendicular and parallel to the blade profile chord. A blade edge visible in the meridional plane can therefore be generated by an infinite number of different blade edge shapes fixed in the aerodynamically relevant chord and chord-orthogonal directions. It cannot therefore clearly describe the shape of the blade edges, and accordingly cannot solve the aerodynamic problem of achieving an advantageous effect on the flow.

SUMMARY

An object underlying the present invention is to provide a blade row group that achieves a favourable flow behaviour due to the fixing of different profile depths of two adjacent member blade rows both in the center area and in the edge areas of the main flow path.

It is a particular object of the present invention to provide solution to the above problems by a blade row group having the features as described herein.

Accordingly, the solution in accordance with the invention provides a blade row group consisting of at least two adjacent blade rows firmly arranged relative to one another (several co-rotating rotor blade rows or several stator vane rows), which can be arranged in a main flow path of a fluid-flow machine. Here, the leading edge of at least one blade of the rear member blade row is provided in the vicinity of a blade of the front member blade row, where between the pressure side of the blade and the suction side of the blade a secondary passage can be formed, if applicable.

Since the profile depths of the blades involved are highly relevant to favourable flow guidance and to blade height-dependent exploitation of the potential effects in the aerodynamically important interference area of the two member blade rows, in at least one part of the area between the mean meridional flow line SLM (in the main flow path center) and at least one of the main flow path boundaries (hub and casing) the profile depth, individually for one of the member blade rows or additively for both rows or effectively for both rows, is provided increasing in the direction of the main flow path boundary. It is thus provided that at least one of the following standardized profile depths increases at least locally in the area between the mean meridional flow line and at least one of the main flow path boundaries in the direction of the main flow path boundary: the standardized profile depth In(i) of the front blade, the standardized profile depth In(i+1) of the rear blade, the standardized additive profile depth Iaddn and/or the standardized effective profile depth Ieffn, in each case of one blade row pairing.

According to an embodiment of the invention, at the main flow path boundary, a profile depth increase of at least 10% is provided relative to the value at the mean meridional flow line. In other words, a value greater than or equal to 1.1 is provided at the main flow path boundary for at least one of the above mentioned standardized profile depths, which in the area between the mean meridional flow line and the main flow path boundary increases at least locally in the direction of the main flow path boundary. Here, the value of the respective profile depth (i.e. the standardized profile depth In(i) of the front blade, the standardized profile depth In(i+1) of the rear blade, the standardized additive profile depth Iaddn and the standardized effective profile depth Ieffn) at the mean meridional flow line is one, as can be seen from the respective definitions of the standardized profile depth.

The present invention relates to blades of fluid-flow machines, such as blowers, compressors, pumps, fans and turbines of the axial, semi-axial and radial type using a gaseous or liquid working medium. The fluid-flow machine may include one or several stages, each stage having a rotor and a stator, in individual cases, the stage is formed by a rotor only. The rotor includes a row of blades or several adjacent blade rows forming a group, which are connected to the rotating shaft of the machine and exchange energy with the working medium. An application in fluid-flow machines where the rotor transfers energy to the working medium is favourable in accordance with the invention. The rotor may be provided with shroud or running gap at the outer blade end. The stator includes a row of stationary vanes or several adjacent vane rows forming a group, which may either feature a fixed or a free vane end with gap on the hub and on the casing side.

Rotor drum and blading are usually enclosed by a casing, in other cases (e.g. aircraft or ship propellers) no such casing exists. The machine may also feature a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from the outside of the annulus duct. In an alternative configuration, multi-stage types of said fluid-flow machine may have two counter-rotating shafts, with the direction of rotation of the rotor blade rows alternating between stages. Here, no stators exist between subsequent rotors. Finally, the fluid-flow machine may—alternatively—feature a bypass configuration such that the single-flow annulus duct divides into two concentric annuli behind a certain blade row, with each of these annuli housing at least one further blade row.

BRIEF DESCRIPTION OF THE DRAWINGS

The present invention is more fully described in the following with reference to the figures of the accompanying drawing showing several exemplary embodiments.

DETAILED DESCRIPTION

Figure 1:
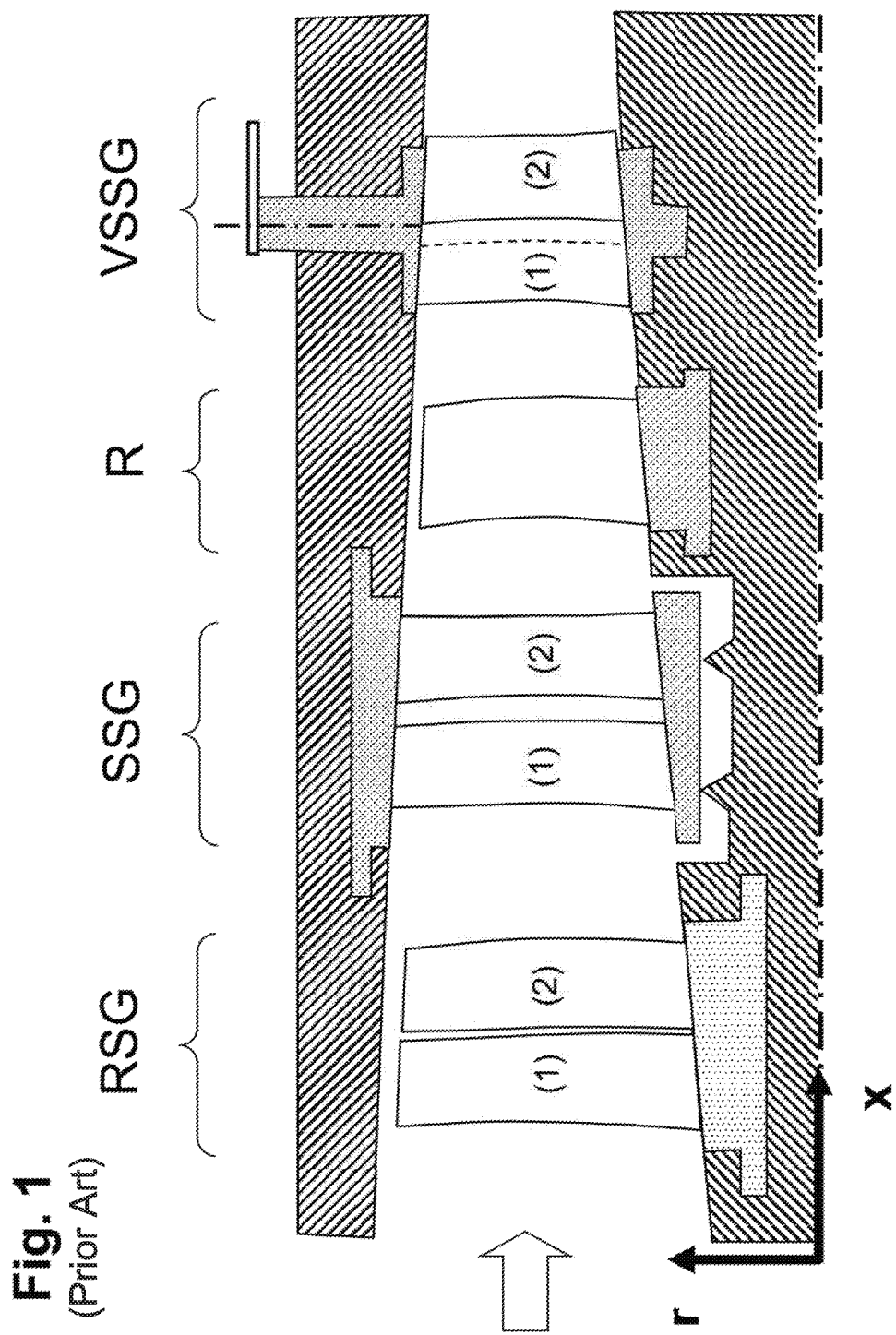
FIG. 1 shows several blade row groups in accordance with the state of the art.

A conventional blade row group according to the state of the art, as shown in FIG. 1, has no special features in respect of a specific variation of the profile depth. In particular, there is no special shape of the four blade edges arising from profile depth variations. There are no further design features which can be innovatively developed by a more complex exploitation of the arrangement as a blade group. A blade row group as considered here has, unlike an individual blade row, a relatively far higher load on the side wall boundary layers, which has to be compensated for by specific additional measures. An excess of profile depth in the area of the blade ends under the specific aerodynamic effect of an arrangement as a blade row group is therefore a way to extend the operating range of blade row groups.

FIG. 1 shows, in the meridional plane established by the axial direction x and the radial direction r, several blade row groups, with each of the blade row groups including two similar member blade rows showing no variation in their relative arrangement to one another (both circumferentially and meridionally). This relates therefore to double-row stator wheels or rotor wheels.

Accordingly, a rotor blade row group RSG includes two rotor blade rows rotating at the same speed and being connected to each other; the first member of the group is marked (1) and the second member of the group is marked (2). A stator vane row group SSG includes two directly adjacent stationary stator vane rows (1) and (2).

A variable stator vane row group VSSG includes two directly adjacent stator vane rows (1) and (2), with one vane of the front row and one vane of the rear row being each provided on a common rotary base and thus jointly settable about the rotary axis.

All blade row groups according to the state of the art have in common that either the two members of the blade row group are arranged at a wide distance from one another, or the individual members are close together and there are hardly any changes in the extent of the blades involved in the profile chord direction and/or the meridional direction along the blade height. A variation of the meridional overlap in the blade height direction is state of the art, but this is considered separately from the extent of the individual member blade rows and lacks any stipulations in the aerodynamically relevant reference system parallel or perpendicular to the profile chord of a blade section. Therefore, a blade section that appears short in the meridional plane (x–r) may actually have a particularly long profile depth. Furthermore, the state of the art lacks any technical teaching on the stipulation in the viewing planes relevant for the flow-mechanical problems.

The solutions according to the state of the art are either unserviceable due to the lack of relevant criteria or are very disadvantageous for the flow in the vicinity of the main flow path boundary (hub or casing). In particular, normal blade rows in accordance with FIG. 1 are disadvantageous due to extremely high pressure losses and non-achievement of the intended flow deflection (both caused by strong secondary flows, boundary layer separation and backflow). The consequence of this is an overall unfavourable performance of the fluid-flow machine in respect of its effectiveness and the stability of the flow.

Figure 2:
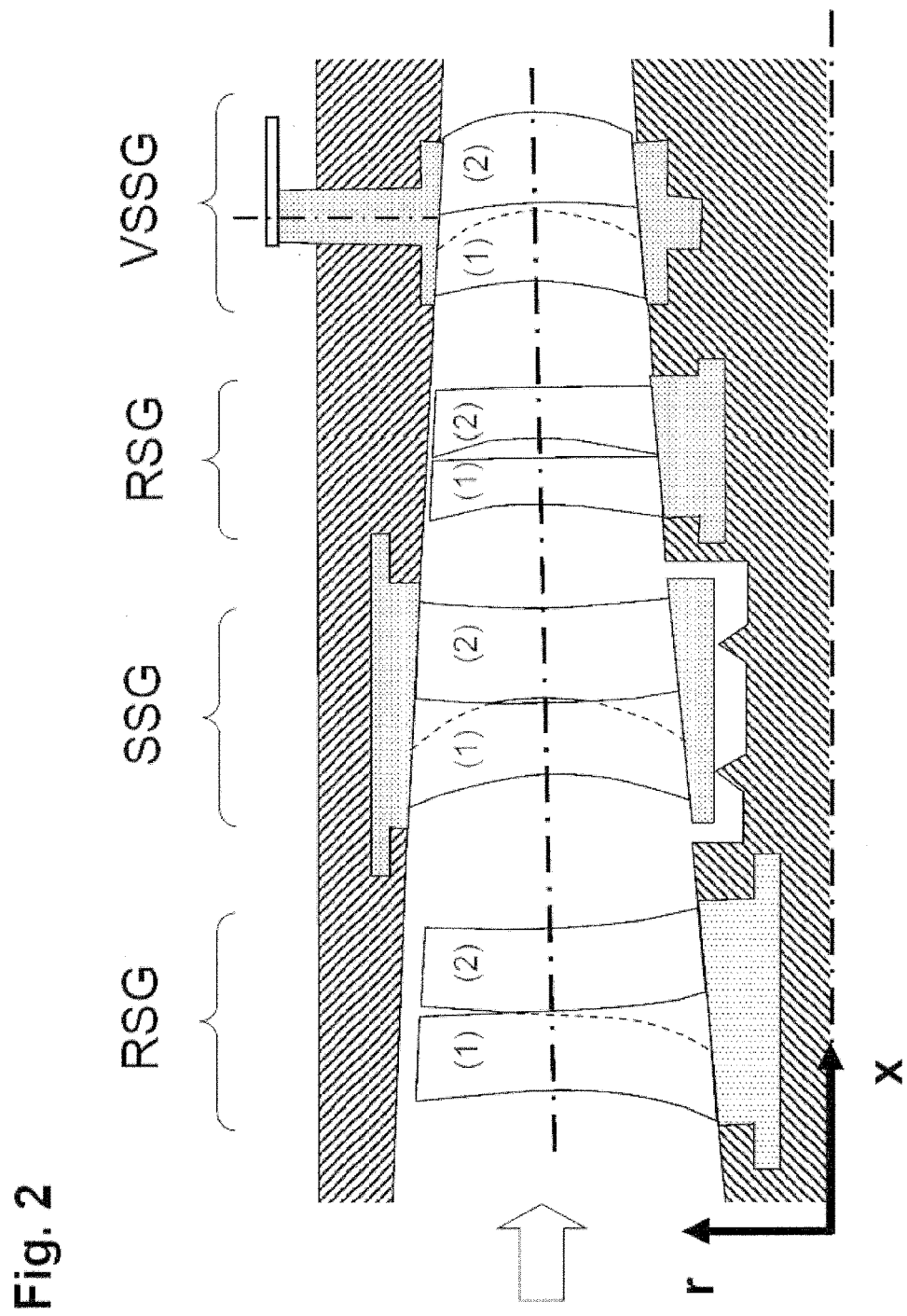
FIG. 2 shows an overview of several blade row groups in accordance with the present invention.

FIG. 2 shows, for the sake of a simplified illustration, various blade groups in accordance with the invention as they may appear in the meridional plane established by the axial direction x and the radial direction r, with the precise stipulation in accordance with the invention to be made in a system related to the profile chord direction. This method is described in detail further down this document. Also here, each of the blade row groups includes two member blade rows that are similar and do not change their positions relative to one another.

Accordingly, a rotor blade row group RSG in accordance with the present invention includes at least two rotor blade rows rotating at the same speed and being connected to each other. A stator vane row group SSG in accordance with the present invention includes at least two directly adjacent stationary stator vane rows.

A variable stator vane row group VSSG according to the present invention includes at least two directly adjacent stator vane rows. A vane of one of the member vane rows, together with at least one vane of its immediately downstream member vane row, is provided here on a common rotary base. Alternatively, as not illustrated here, at least two vanes appertaining to different member vane rows can also be arranged on an individual rotary base each.

Each of the blade row groups RSG, SSG and VSSG in accordance with the present invention can also have more than two member blade rows.

The described configuration of the blade row group includes the possibility that on at least one member blade row the distance between two adjacent blades varies along the circumference. It may also be favourable if the axial position of two adjacent blades of this blade row varies along the circumference. It may also be favourable if the profile depth of two adjacent blades of this blade row varies along the circumference.

It may be advantageous if the numbers of blades of two adjacent member blade rows are in a special ratio to each other, i.e. the number of blades of the member blade row (i) is a multiple of the number of blades of the member blade row (i+1), or the number of blades of the member blade row (i+1) is a multiple of the number of blades of the member blade row (i), or the number of blades of the member blade row (i) equals the number of blades of the member blade row (i+1). It may be particularly advantageous if the blade numbers of the rows (i) and (i+1) have a ratio of 1:2.

Figure 3:
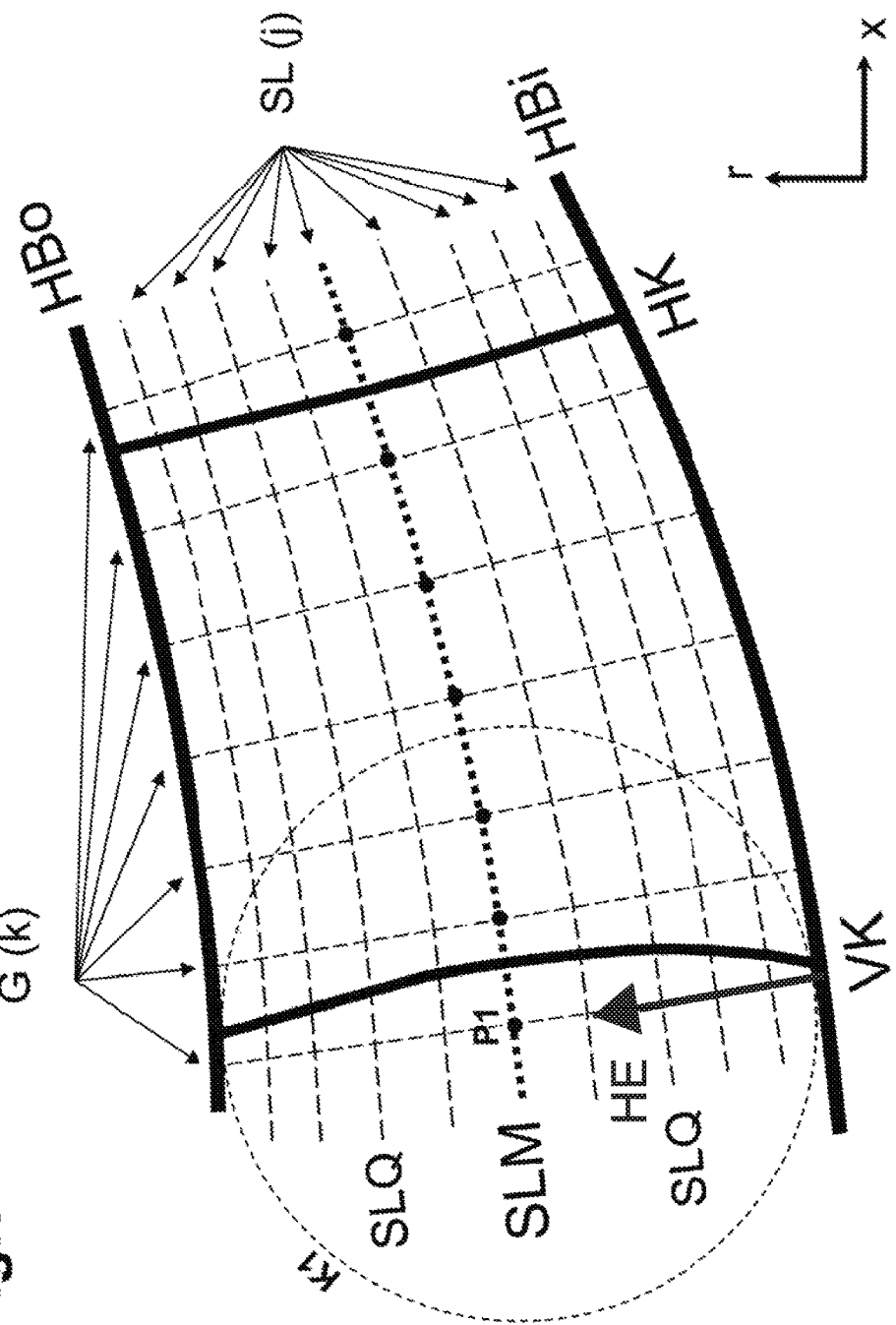
FIG. 3 shows the definition of meridional flow lines.

For the purpose of preparing definitions important in accordance with the present invention, FIG. 3 shows, for the definition of meridional flow lines, a main flow path of a fluid-flow machine with through-flow from left to right (indicated by the bold arrow) in the meridional plane established by the axial coordinate x and the radial coordinate r, where the main flow path is delimited by the radially inner main flow path boundary HBi and by the radially outer main flow path boundary HBo. The mean meridional flow line SLM is in the center between the radially inner main flow path boundary HBi and the radially outer main flow path boundary HBo. Its course matches the connection of the center points of circles inscribed in the main flow path, as is made clear by the example in the illustration for the first marked point P1 on the mean meridional flow line SLM and the appertaining circle K1. VK and HK indicate the leading edge and the trailing edge of a blade arranged in the main flow path.

There is a family of straight lines G(k) inside the main flow path whose members are each perpendicular to the mean meridional flow line SLM and end at the main flow path boundaries HB. Further meridional flow lines SL(j) are defined by the connection of points with an identical percentage subdivision of the straight lines G(k) between the main flow path boundaries HB in each case.

The rotation of a meridional flow line about the machine axis results in a meridional flow surface SF(j). The intersection of a meridional flow surface with a blade of the fluid-flow machine results in a meridional flow line section SLS(j). In the center between one of the main flow path boundaries HBi and HBo and the mean meridional flow line SLM, the quarter meridional flow line SLQ results in this way.

Figure 4:
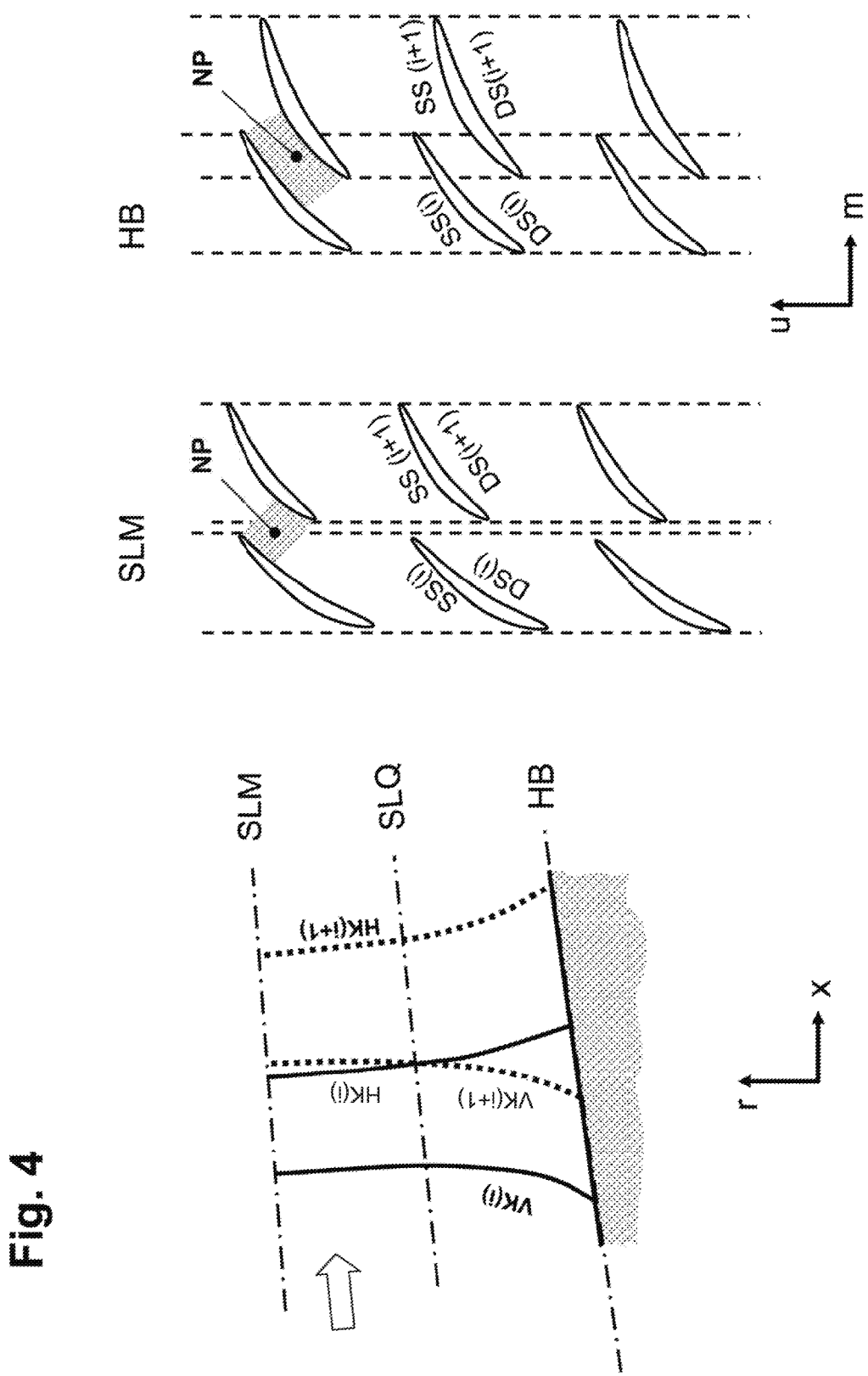
FIG. 4 shows a blade row group in accordance with the present invention including a circumferential view.

It can occur, depending on the blade shape, that the profile depths and blade edge shapes in the meridional plane (x,r) cannot be recorded quantitatively, or not at all. For that reason, they must be viewed in a profile chord direction-related coordinate system for stipulations in accordance with the invention. In this connection, FIG. 4 shows firstly on its left-hand side an arrangement of two adjacent member blade rows (i) and (i+1) appertaining to a blade row group in accordance with the invention in the meridional plane established by the axial direction x and the radial direction r. Shown is the inventive arrangement in the area between the main flow path center (mean meridional flow line SLM along the meridional direction m there) and a main flow path boundary HB. The main flow path boundary HB is a contour at the hub or at the casing of the fluid-flow machine, for example at a rotary base, a wall, a stator root, a stator shroud, a rotor root or a rotor shroud.

The main flow path boundary HB is either firmly connected to the end of at least one member blade row (as shown in FIG. 4), or a gap is provided between the main flow path boundary and at least the end of a member blade row.

The arrangement shows the two member blade rows (i) and (i+1), each with two blade edges, leading edge VK(i) and trailing edge HK(i) or leading edge VK(i+1) and trailing edge HK(i+1).

The right-hand side of FIG. 4 shows the arrangement of the two member blade rows viewed in a meridional flow surface established by the meridional coordinate m and the circumferential direction u. An appropriate circumferential development is shown on the mean meridional flow line blade section SLM in the main flow path center and at the main flow path boundary HB. For simplicity's sake (but not absolutely necessary in accordance with the invention), the two member blade rows here have the same blade numbers. Also advantageous is a blade number ratio of 1:2 for the rows (i) and (i+1), where every second blade of the row (i+1) is arranged close to the pressure side of a blade of the row (i). The suction sides of the blades (i) and (i+1) are identified respectively with SS(i) and SS(i+1), and the pressure sides with DS(i) and DS(i+1).

The blades can advantageously be provided such that between the pressure side of a blade (i) and the suction side of a blade (i+1), a secondary passage (illustrated as a shaded area and identified with NP) is created.

It can be provided that in at least one area of the main flow path height from the leading edge VK(i+1) of the rear member blade row to the trailing edge HK(i) of the front member blade row a meridional meshing is provided whose amount increases in the direction of at least one of the main flow path boundaries HB in at least one partial section. A meridional meshing of this type can be provided for all exemplary embodiments of the invention.

Figure 5:
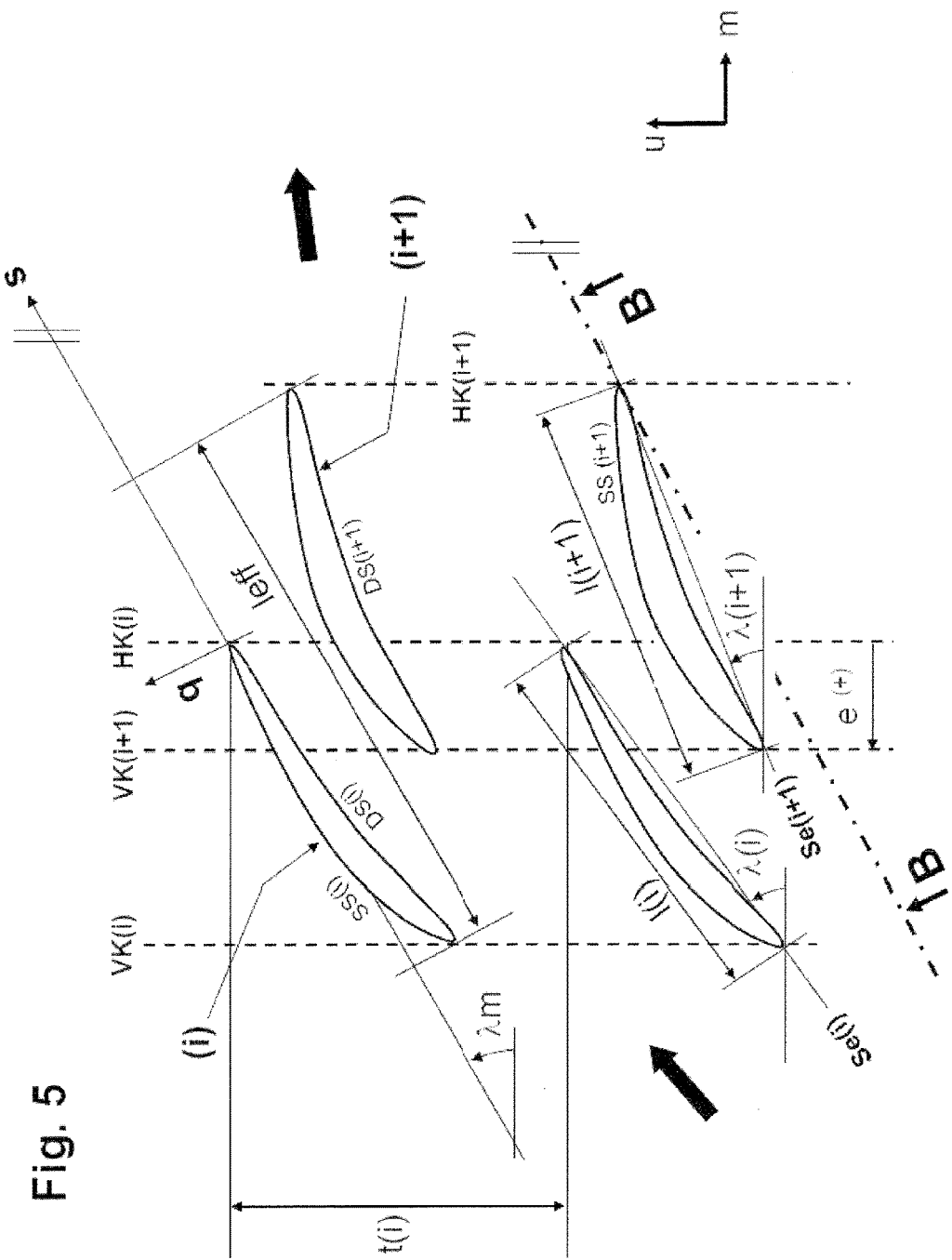
FIG. 5 shows definitions in accordance with the present invention in a meridional flow line section.

FIG. 5 shows, as does the right-hand side of FIG. 4, a meridional flow line blade section. The definitions of various relevant quantities and views in the plane established by the meridional direction m and by the circumferential coordinate u are provided. For simplification, only two blades and the intermediate blade main passage of the member blade rows (i) and (i+1) are shown in each case. The main flow direction is identified by bold black arrows. The connecting lines of the blade edges are accordingly identified with VK(i), HK(i), VK(i+1) and HK(i+1). Each blade profile is shown with its suction side SS and its pressure side DS. It is pointed out that for purposes of a clearer illustration in FIG. 5 and also in the other figures, no distinction is made between the identification of the member blade rows (i) and (i+1) and the identification of the individual blades in the member blade rows, i.e. the blades too are identified with (i) and (i+1).

The chord Se(i) of the front blade is defined as the tangent lying on the profile of the blade (i) on the pressure side. The chord Se(i+1) of the rear blade is defined as the tangent lying on the profile of the blade (i+1) on the pressure side.

The profile depth I(i) of the front blade and the profile depth I(i+1) of the rear blade are provided in the direction of the respective chord. The values of the profile depths I(i) and I(i+1) on the mean meridional flow line are identified as I(i)SLM and I(i+1)SLM. The standardized profile depths are obtained from:

$$In(i)=I(i)/I(i)SLM \text{ and } In(i+1)=I(i+1)/I(i+1)SLM$$

The profile depth ratio PTV is defined as: PTV=I(i)/I(i+1). The value of the profile depth ratio PTV on the mean meridional flow line is identified as PTVSLM. The relative profile depth ratio PTVr is defined in accordance with:

$$PTVr=PTV/PTVSLM$$

The additive profile depth Iadd is defined in accordance with: Iadd=I(i)+I(i+1). The value of the additive profile depth Iadd on the mean meridional flow line is identified as IaddSLM. The standardized additive profile depth is obtained from:

$$Iaddn=Iadd/IaddSLM$$

The stagger angle of the front blade lambda(i) ($\lambda$i) is defined as the angle of inclination of the chord of the front blade S(i) relative to the meridional direction m. The stagger angle of the rear blade lambda(i+1) ($\lambda$i+1) is defined as the angle of inclination of the chord of the rear blade S(i+1) relative to the meridional direction m. The mean stagger angle lambdam ($\lambda$m) is defined as the mean value of the stagger angles lambda(i) and lambda(i+1), in accordance with: lambdam=(lambda(i)+lambda(i+1))/2.

The coordinate direction s is inclined with lambdam relative to the meridional direction m and faces downstream. The coordinate direction q is perpendicular to s, and its orientation leads away from the pressure side of the blade (i). The coordinate direction or is perpendicular to s and q.

The effective profile depth Ieff is defined as the distance between the leading edge of the blade (i) and the trailing edge of the blade (i+1) measured parallel to the coordinate direction s.

The value of the effective profile depth Ieff on the mean meridional flow line is identified as IeffSLM. The standardized effective profile depth is obtained from:

$$Ieffn=Ieff/IeffSLM$$

The front blade spacing t(i) is defined as the distance between two adjacent blades of the blade row (i) in their trailing edge plane in the circumferential direction u.

The meridional meshing e is measured parallel to the direction of the meridional coordinate m from the leading edge of a blade (i+1) to the trailing edge of a blade (i) and has a positive sign against the meridional flow direction.

For the definition of the view B-B, it is assumed that the meridional flow line blade section shown in FIG. 5 is located on the mean meridional flow line SLM. The mean chord direction identified by the coordinate direction s is representative of the local main flow direction in the flow-mechanical interference area of the blades (i) and (i+1). A fixed relationship to this identified and important mean chord direction is therefore essential for stipulating characteristic features of a blade row group that are correct in terms of flow mechanics. For this reason, the effective profile depth Ieff is defined in the coordinate system (s–q) of the mean chord direction and their orthogonals. Additionally, in view B-B all blade edges of the group can be usefully assessed and described in terms of their flow-mechanical effect.

The view B-B is tangential to the mean meridional flow section (conical surface around the machine axis) and perpendicular to the mean chord direction—identified by the coordinate direction s—of the blade arrangement in the mean meridional flow line blade section.

In the following, stipulations in accordance with the invention are made regarding the properties of the various profile depth parameters of the blade row group. Different approaches are necessary here for the area of 2-dimensional flow around the mean meridional flow line section SLM and for the area of 3-dimensional flow around the main flow path boundary HB, and also with the special requirement that two blade rows are close together in a group with a strong mutual potential field influence, and must in this way fundamentally differ from individual blade rows, in particular with regard to an advantageous selection of the profile depth parameters.

Due to the mutual potential effect of the member blade rows on one another, a high profile depth, applying in the area of the main flow path boundary, assumes an important role. By increasing the profile depth towards the main flow path boundary, the necessary additional aerodynamic supporting effect can be achieved.

Starting from a profile depth value in the center of the main flow path, stipulations for profile depth values in the direction of the main flow path boundary HB are made in the following. This is achieved using the standardized profile depths.

Figure 7:
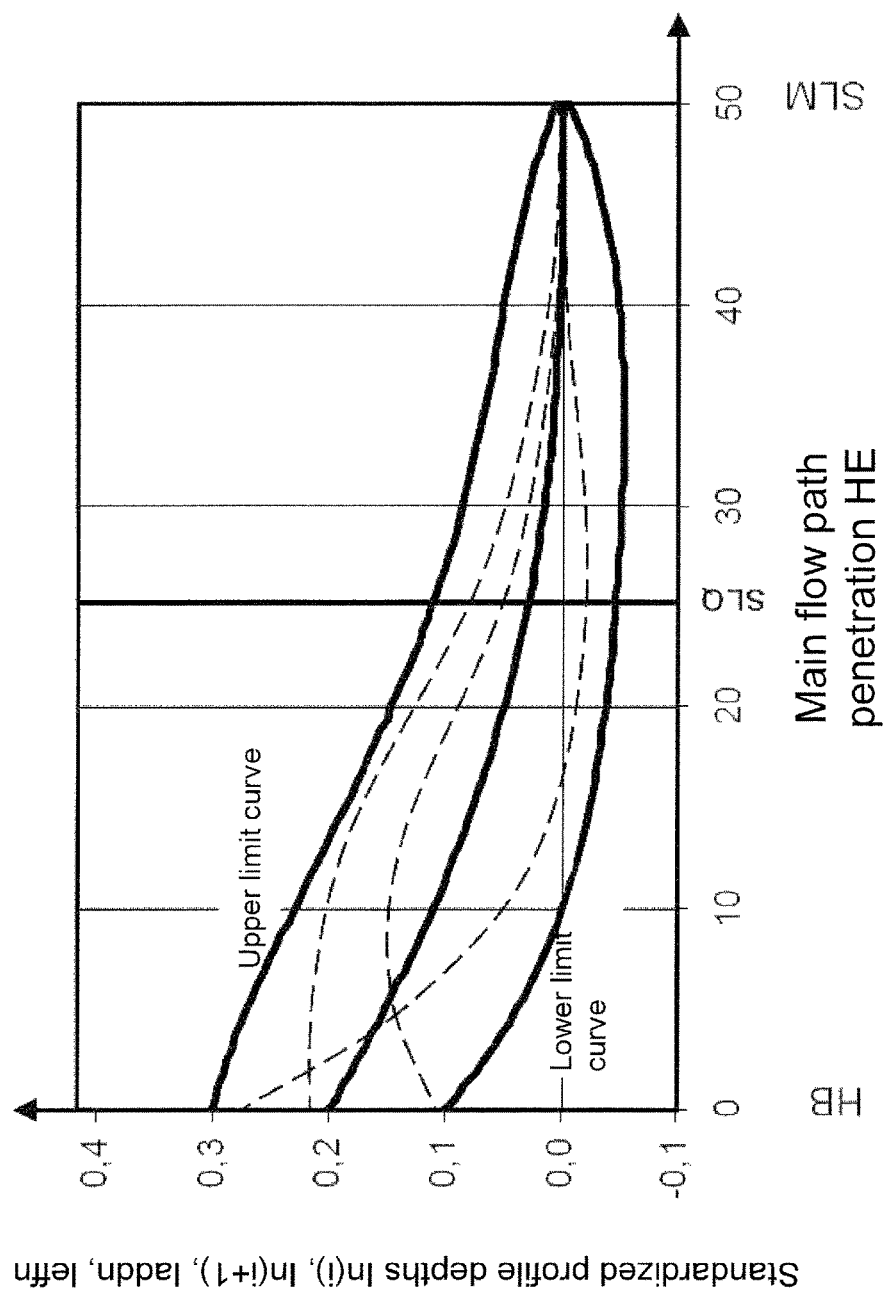
FIG. 7 shows definitions in accordance with the present invention of the standardized profile depths.

FIG. 7 shows some forms, possible in accordance with the invention, of the course of the standardized profile depths, plotted over the main flow path penetration HE.

It is favourable in accordance with the invention for a blade row group when at least one of the standardized profile depths In(i), In(i+1), Iaddn and Ieffn of the blade row pairing (i) and (i+1) in the area between the mean meridional flow line SLM and the main flow path boundary HB increases at least locally in the direction of HB and assumes at HB a value greater than or equal to 1.1, corresponding to an at least 10% profile depth increase over the value on SLM.

A value of at least one of the standardized profile depths at the main flow path boundary HB in the range of 1.15<In<1.20 is particularly favourable. In special applications, in particular under conditions which are relaxed in terms of strength, a value of at least one of the standardized profile depths at the main flow path boundary HB in the range of 1.2<In<1.3 can also be advantageous.

It can furthermore be advantageous when at least one of the following qualitative features of the course (of at least one of the standardized profile depths In(i), In(i+1), Iaddn and Ieffn) is provided along the blade height:
A) A substantially or exactly constant course in a partial area between SLM and HB, where it can be advantageous when
   a) the partial area adjoins SLM, or
   b) the partial area adjoins HB.
B) A substantially or exactly linear increase in the direction of HB in at least one partial area between SLM and FIB, where it can be advantageous when
   a) the partial area adjoins SLM, or
   b) the partial area adjoins HB, or
   c) the partial area adjoins neither SLM nor HB, or
   d) the entire area between SLM and HB is concerned.
C) A progressive increase in the direction of FIB in at least one partial area between SLM and HB, where it can be advantageous when a) the partial area adjoins SLM, or
b) the partial area adjoins HB, or
c) the partial area adjoins neither SLM nor FIB, or
d) the entire area between SLM and HB is concerned.
D) A degressive increase in the direction of HB in at least one partial area between SLM and HB, where it can be advantageous when
a) the partial area adjoins HB, or
b) the partial area adjoins neither SLM nor HB.
E) A decrease in the direction of HB in a partial area between SLM and HB, where
a) the partial area adjoins SLM, or
b) the partial area adjoins HB, or
c) the partial area adjoins neither SLM nor HB.
F) The development of a minimum in the area between SLM and HB (not on SLM or HB)
G) The development of a maximum in the area between SLM and HB (not on SLM or HB)

Further advantages are obtained when one of the following feature combinations of the course from SLM to HB is provided:
H) A progressive increase, then a substantially or exactly linear increase up to HB
I) A progressive increase, then a degressive increase up to HB
J) A substantially or exactly linear increase, then a progressive increase up to HB
K) A substantially or exactly linear increase, then a progressive increase, then a substantially or exactly linear increase up to HB
L) A substantially or exactly linear increase, then a progressive increase, then a degressive increase up to HB
M) A substantially or exactly constant course, then a progressive increase up to HB
N) A substantially or exactly constant course, then a progressive increase, then a substantially or exactly linear increase up to HB
O) A substantially or exactly constant course, then a progressive increase, then a degressive increase up to HB
P) A decrease, then a minimum, then a progressive increase up to HB
Q) A decrease, then a minimum, then a progressive increase, then a degressive increase up to HB It is furthermore advantageous for the courses in accordance with the invention when it is the case, for at least one of the standardized profile depths, that with a main flow path penetration of 25% (on the quarter meridional flow line SLQ) only a small proportion of the increase is provided relative to the value on the mean meridional flow line SLM, in accordance with:

(In on $SLQ$) <= ((In max)−1)*0.3)+1; <= means "less than or equal to"

Figure 6:
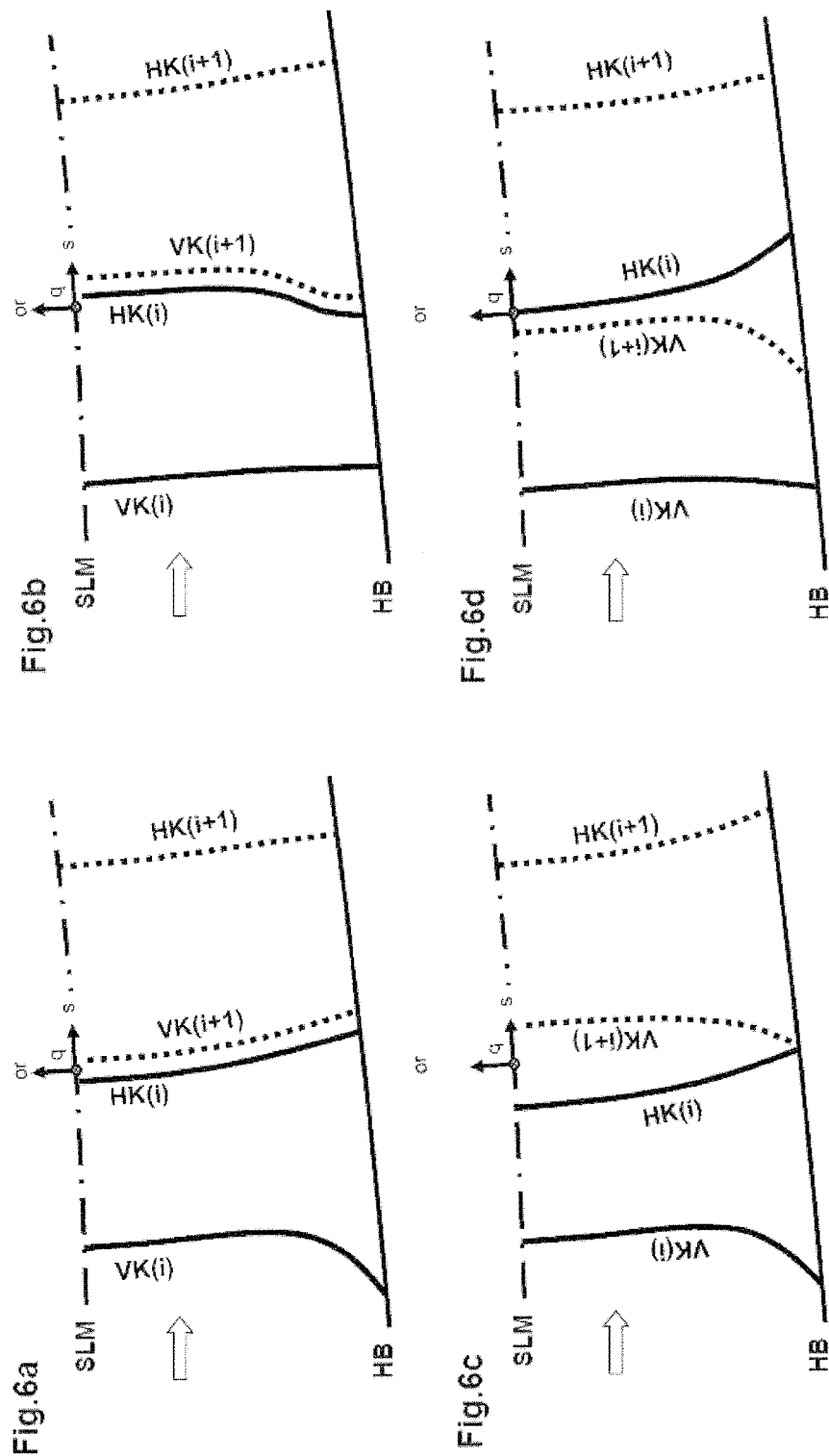
FIG. 6 shows blade row groups in accordance with the present invention in view B-B.

It is furthermore favourable when at least one of the above stipulations on the profile depth is applicable at the same time for the standardized profile depths In(i) and In(i+1). A possible blade arrangement in accordance with the invention is shown in FIG. 6, partial illustrations 6c, 6d. It can be advantageous here when the standardized effective profile depth Ieffn is constant within a tolerance of +/−2% of its value on the mean meridional flow line (IeffnSLM) in the area between SLM and HB. A possible blade arrangement in accordance with the invention is shown in FIG. 6, partial illustration 6d.

It is alternatively favourable when at least one of the above stipulations is applicable at the same time for the standardized profile depths In(i), In(i+1) and Ieffn. A possible blade arrangement in accordance with the invention is shown in FIG. 6, partial illustration 6c.

It is alternatively favourable when the above stipulations are applicable only for the standardized profile depth In(i), and the standardized profile depth In(i+1) at the main flow path boundary HB is smaller than on the mean meridional flow line SLM. A possible blade arrangement in accordance with the invention is shown in FIG. 6, partial illustration 6a. It can be advantageous here when the standardized effective profile depth Ieffn is constant within a tolerance of +/−2% of its value on the mean meridional flow line (IeffnSLM) in the area between the mean meridional flow line SLM and the main flow path boundary HB. It can additionally be advantageous here when the standardized additive profile depth Iaddn is constant within a tolerance of +/−2% of its value on the mean meridional flow line (IaddnSLM) in the area between the mean meridional flow line SLM and the main flow path boundary HB.

It is alternatively favourable when the above stipulations are applicable only for the standardized profile depth In(i+1) of the blades (i+1) of a rear blade row, and the standardized profile depth In(i) at the main flow path boundary HB is smaller than on SLM. A possible blade arrangement in accordance with the invention is shown in FIG. 6, partial illustration 6b. It can be advantageous here when the standardized effective profile depth Ieffn is constant within a tolerance of +/−2% of its value on the mean meridional flow line (IeffnSLM) in the area between the mean meridional flow line SLM and the main flow path boundary HB. It can additionally be advantageous here when the standardized additive profile depth Iaddn is constant within a tolerance of +/−2% of its value on the mean meridional flow line (IaddnSLM) in the area between the mean meridional flow line SLM and the main flow path boundary HB.

Regarding the profile depths of a blade row group it is furthermore advantageous when the distribution in accordance with FIG. 7 of at least one of the standardized profile depths In(i), In(i+1), Iaddn and Ieffn of the blade row pairing (i) and (i+1) in the area between the mean meridional flow line SLM and the main flow path boundary HB over the main flow path penetration HE is completely below an upper limit curve Ino and completely above a lower limit curve Inu, where said upper limit curve is provided by:

$$Ino = -2E\text{-}07(HE)^{}4 + 2E\text{-}05(HE)^{}3 - 0.0004(HE)^{**}2 - 0.004(HE) + 0.3$$

and said lower limit curve is provided by:

$$Inu = 1E\text{-}07(HE)^{}4 - 1E\text{-}05(HE)^{}3 + 0.0007(HE)^{**}2 - 0.0154(HE) + 0.1.$$

It is furthermore favourable when the standardized profile depths In(i) and In(i+1) are at the same time provided completely between the limit curves. It can be advantageous here when the standardized effective profile depth Ieffn is also provided completely between the limit curves.

It is alternatively favourable when only the standardized profile depth In(i) is provided completely between the limit curves, and the standardized profile depth In(i+1) is at least partially provided between the limit curves. It can be advantageous here when the standardized effective profile depth Ieffn is constant within a tolerance of +/−2% of its value on the mean meridional flow line (IeffnSLM) in the area between the mean meridional flow line SLM and the main flow path boundary HB. It can additionally be advantageous here when the standardized additive profile depth Iaddn is constant within a tolerance of +/−2% of its value on the mean meridional flow line (IaddnSLM) in the area between the mean meridional flow line SLM and the main flow path boundary KB.

It is alternatively favourable when only the standardized profile depth In(i+1) is provided completely between the limit curves, and the standardized profile depth In(i) is at least partially provided between the limit curves. It can be advantageous here when the standardized effective profile depth Ieffn is constant within a tolerance of +/−2% of its value on the mean meridional flow line (IeffnSLM) in the area between the mean meridional flow line SLM and the main flow path boundary HB. It can additionally be advantageous here when the standardized additive profile depth Iaddn is constant within a tolerance of +/−2% of its value on the mean meridional flow line (IaddnSLM) in the area between the mean meridional flow line SLM and the main flow path boundary HB.

It can furthermore be favourable when the distribution of at least one of the standardized profile depths In(i), In(i+1), Iaddn and Ieffn of the blade row pairing (i) and (i+1) in the area between the mean meridional flow line SLM and the main flow path boundary HB is defined within a band around a central distribution Inc, in accordance with:

$Inc-0.05 < In < Inc+0.05$, where $In$ identifies the standardized profile depth, where the following applies:

$Inc = -1E-08(HE)^{}4 + 3E-07(HE)^{}3 + 0.0001(HE)^{**}2 - 0.0105(HE) + 0.2$

It is furthermore favourable when the standardized profile depths In(i) and In(i+1) are at the same time provided completely within the band. It can be advantageous here when the standardized effective profile depth Ieffn is also provided completely within the band.

It is alternatively favourable when only the standardized profile depth In(i) is provided completely within the band, and the standardized profile depth In(i+1) is provided at least partially within the band. It can be advantageous here when the standardized effective profile depth Ieffn is constant within a tolerance of +/−2% of its value on the mean meridional flow line (IeffnSLM) in the area between the mean meridional flow line SLM and the main flow path boundary HB. It can additionally be advantageous here when the standardized additive profile depth Iaddn is constant within a tolerance of +/−2% of its value on the mean meridional flow line (IaddnSLM) in the area between the mean meridional flow line SLM and the main flow path boundary HB.

It is alternatively favourable when only the standardized profile depth In(i+1) is provided completely within the band, and the standardized profile depth In(i) is provided at least partially within the band. It can be advantageous here when the standardized effective profile depth Ieffn is constant within a tolerance of +/−2% of its value on the mean meridional flow line (IeffnSLM) in the area between the mean meridional flow line SLM and the main flow path boundary HB. It can additionally be advantageous here when the standardized additive profile depth Iaddn is constant within a tolerance of +/−2% of its value on the mean meridional flow line (IaddnSLM) in the area between the mean meridional flow line SLM and the main flow path boundary HB.

Also of importance in connection with the profile depths of a blade row group is the distribution of the aerodynamic load over the profiles of the member blade rows (i) and (i+1). Among other parameters, the ratio of the profile depths $PTV = I(i)/I(i+1)$ is characteristic here.

It is favourable in accordance with the invention, when on the mean meridional flow line SLM values of the profile depth ratio of $0.8 < PTVSLM < 2.0$ are provided. It is advantageous here when the profile depth ratio is provided in the range of $1.0 < PTVSLM < 2.0$. It is particularly advantageous here when the profile depth ratio is provided in the range of $1.2 < PTVSLM < 1.4$. Values in the range of $1.15 < PTVSLM < 1.25$ result in further advantages here. With structural restrictions, values in the range of $1.25 < PTVSLM < 1.35$ may also result in improved solutions.

The same stipulations for PTV can apply, in accordance with the invention, for meridional flow line sections in the vicinity of the main flow path center with main flow path penetrations greater than or equal to 30%.

Assuming a value PTVSLM in the center of the main flow path, stipulations for PTV in the direction of the main flow path boundary HB are made in the following. This is done using the relative profile depth ratio PTVr (quotient of the local profile depth ratio and the value on the mean meridional flow line SLM).

Figure 8:
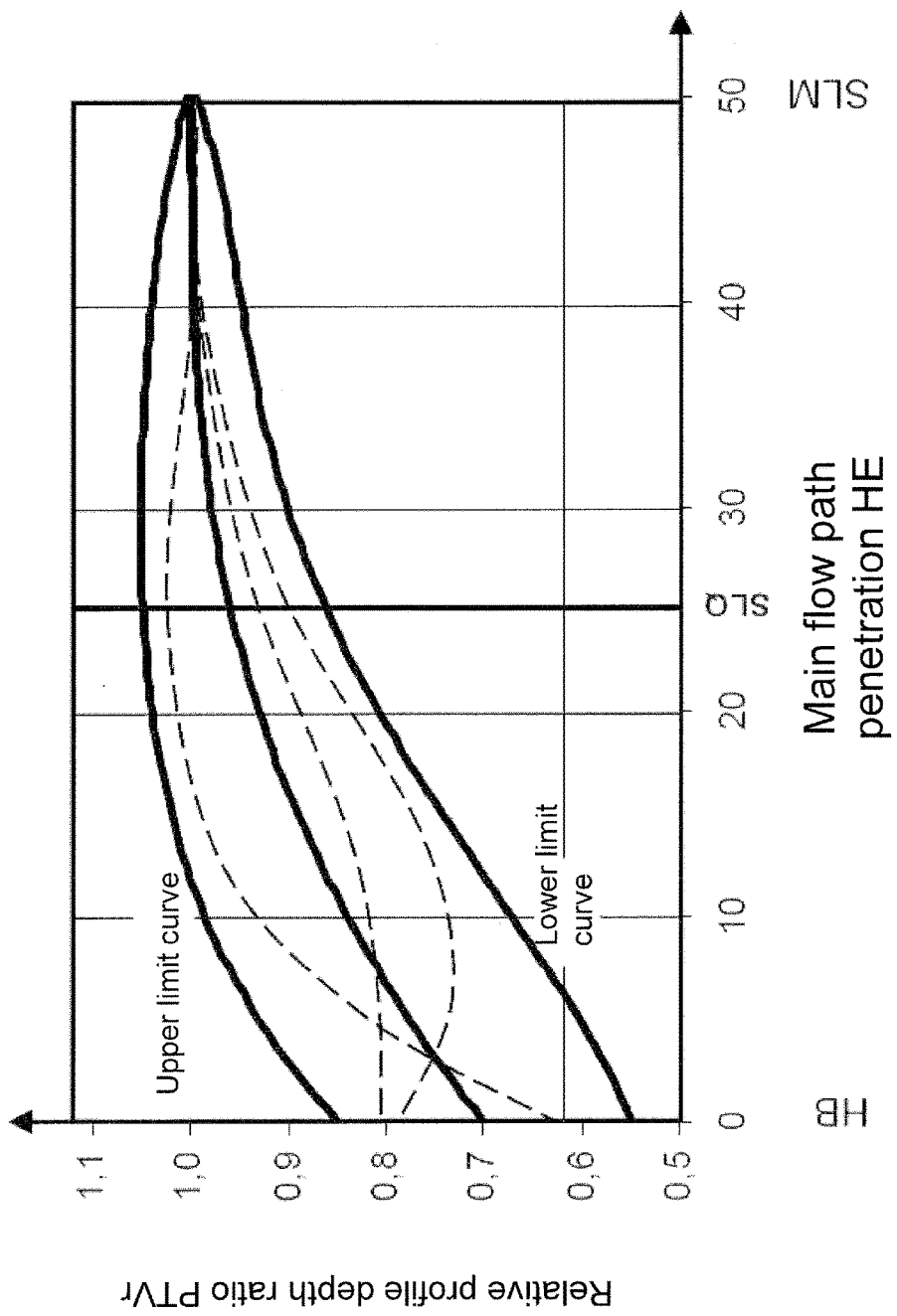
FIG. 8 shows definitions in accordance with the present invention of the relative profile depth ratio.

FIG. 8 shows some forms, possible in accordance with the invention, of the course of the relative profile depth ratio PTVr, plotted over the main flow path penetration HE.

It is favourable in accordance with the invention for a blade row group when the relative profile depth ratio PTVr in the area between the mean meridional flow line SLM and the main flow path boundary HB decreases at least locally in the direction of the main flow path boundary HB and assumes at HB a value of less than or equal to 0.85, corresponding to an at least 15% reduction over the value on SLM.

A value of the relative profile depth ratio at HB in the range of $0.8 > PTVr > 0.6$ is particularly favourable. In special applications, in particular under conditions which are relaxed in terms of strength, a value of the relative profile depth ratio at HB in the range of $0.6 > PTVr > 0.55$ can also be advantageous.

It can furthermore be advantageous when at least one of the following qualitative features of the course of the relative profile depth ratio PTVr is provided along the blade height:

A) A substantially or exactly constant course in a partial area between SLM and HB, where it can be advantageous when
   a) the partial area adjoins SLM, or
   b) the partial area adjoins HB.

B) A substantially or exactly linear decrease in the direction of HB in at least one partial area between SLM and HB, where it can be advantageous when
   a) the partial area adjoins SLM, or
   b) the partial area adjoins HB, or
   c) the partial area adjoins neither SLM nor HB, or
   d) the entire area between SLM and HB is concerned.

C) A progressive decrease in the direction of HB in at least one partial area between SLM and HB, where it can be advantageous when
   a) the partial area adjoins SLM, or
   b) the partial area adjoins HB, or
   c) the partial area adjoins neither SLM nor HB, or
   d) the entire area between SLM and HB is concerned.

D) A degressive decrease in the direction of HB in at least one partial area between SLM and HB, where it can be advantageous when
   a) the partial area adjoins HB, or
   b) the partial area adjoins neither SLM nor HB.

E) An increase in the direction of HB in a partial area between SLM and HB, where a) the partial area adjoins SLM, or
b) the partial area adjoins HB, or
c) the partial area adjoins neither SLM nor HB.

F) The development of a maximum in the area between SLM and HB (not on SLM or HB)
G) The development of a minimum in the area between SLM and HB (not on SLM or HB)

Further advantages are obtained when one of the following feature combinations of the course of PTVr from SLM to HB is provided:

H) A progressive decrease, then a substantially or exactly linear decrease up to HB
I) A progressive decrease, then a degressive decrease up to HB
J) A substantially or exactly linear decrease, then a progressive decrease up to HB
K) A substantially or exactly linear decrease, then a progressive decrease, then a substantially or exactly linear decrease up to HB
L) A substantially or exactly linear decrease, then a progressive decrease, then a degressive decrease up to HB
M) A substantially or exactly constant course, then a progressive decrease up to HB
N) A substantially or exactly constant course, then a progressive decrease, then a substantially or exactly linear decrease up to HB
O) A substantially or exactly constant course, then a progressive decrease, then a degressive decrease up to HB
P) An increase, then a maximum, then a progressive decrease up to HB
Q) An increase, then a maximum, then a progressive decrease, then a degressive decrease up to HB It is furthermore advantageous for the courses of PTVr in accordance with the invention when it is the case that with a main flow path penetration of 25% (on the quarter meridional flow line SLQ) only a small proportion of the decrease is provided relative to the value on the mean meridional flow line SLM, in accordance with:

$$(PTVr \text{ on } SLQ) \geq = 1-(1-(PTVr\text{max.}))*0.3) \geq = \text{means "greater than or equal to"}$$

It is furthermore favourable when the relative profile depth ratio PTVr of the blade row pairing (i) and (i+1) in accordance with FIG. 8 in the area between the mean meridional flow line SLM and the main flow path boundary HB, plotted over the main flow path penetration HE is completely below an upper limit curve PTVro and completely above a lower limit curve PTVru, where said upper limit curve is provided by:

$$PTVro=-8E-08(HE)4+1E-05(HE)3-0.0007(HE)**2+0.0194(HE)+0.85$$

and said lower limit curve is provided by:

$$PTVru=2E-07(HE)4-2E-05(HE)3+0.0006(HE)**2+0.0081(HE)+0.55.$$

It can furthermore be favourable when the distribution of the relative profile depth ratio PTVr in the area between the mean meridional flow line SLM and the main flow path boundary HB is defined within a band around a central distribution PTVrc, in accordance with:

$$PTVrc-0.05 < PTVr < PTVrc+0.05,$$

where the following applies:

$$PTVrc=2E-08(HE)4+1E-08(HE)3-0.0003(HE)**2+0.0165(HE)+0.7.$$

It can furthermore be advantageous when in at least one area of the blade height adjoining one of the main flow path boundaries (hub and casing) between the front section of the suction side of a blade in a member blade row (i+1) and the rear section of the pressure side of a blade in a member blade row (i) a secondary passage is provided that guides the flow locally and favourably matches the interference behaviour of the member blade rows (i) and (i+1) along the blade height.

The present figure description describes the standardized profile depths between the mean meridional flow line (SLM) and one of the main flow path boundaries (HB). To the other of the two main flow path boundaries, it is possible starting from the mean meridional flow line (SLM) to achieve an appropriate course of the standardized profile depths, where—relative to the mean meridional flow line (SLM)—both symmetrical and asymmetrical courses of the standardized profile depth can be achieved.

An advantageous flow behaviour in a blade group in accordance with the invention can therefore result when in the area of the blade ends at the hub and casing adjoining the respective main flow path boundary, in each case at least one of the features described in the above text is provided. It can be provided here that in the area of the hub and of the casing at least one identical feature or even completely identical features are provided.

What is claimed is:

1. A blade row group arrangeable in a main flow path of a fluid-flow machine, comprising:
   a quantity (N) of adjacent member blade rows arranged relative to one another in both a meridional direction (m) and a circumferential direction (u), with the quantity (N) of the member blade rows being greater than or equal to 2 and (i) designating a running index with values between 1 and the quantity (N), the quantity (N) of adjacent member blade rows including a front member blade row with front blades (i) each having a leading edge and a trailing edge and a rear member blade row with rear blades (i+1) each having a leading edge and a trailing edge,
   where the blade row group has two main flow path boundaries (HB),
   a plurality of meridional flow line sections through the blade row group on m-u planes, where in each meridional flow line section, a chord (Se(i)) of one of the front blades and a chord (Se(i+1)) of one of the rear blades are defined as tangents lying on respective profiles on a pressure side of the one of the front blades and a pressure side of the one of the rear blades,
   where a profile depth (I(i)) of the one of the front blades and a profile depth (I(i+1)) of the one of the rear blades are provided in a direction of the respective chord,
   where values of the profile depths (I(i)) and (I(i+1)) on a mean meridional flow line are identified as (I(i)SLM) and (I(i+1)SLM),
   where a standardized profile depth (In(i)) of the one of the front blades and a standardized profile depth (In(i+1)) of the one of the rear blades are defined as In(i)=I(i)/I(i)SLM and In(i+1)=I(i+1)/I(i+1)SLM,
   where a profile depth ratio (PTV) of the one of the front blades and the one of the rear blades is defined as: PTV=I(i)/I(i+1),
   where a value of the profile depth ratio (PTV) on the mean meridional flow line is identified as PTVSLM, and a relative profile depth ratio (PTVr) is defined as: PTVr=PTV/PTVSLM, where an additive profile depth (Iadd) of the one of the front blades and the one of the rear blades is defined as: Iadd=I(i)+I(i+1), where a value of the additive profile depth (Iadd) on the mean meridional flow line is identified as IaddSLM, where a standardized additive profile depth (Iaddn) is defined as Iaddn=Iadd/IaddSLM, where a stagger angle (lambda(i)) of the one of the front blades and a stagger angle (lambda(i+1)) of the one of the rear blades are defined as angles of inclination of the respective chords relative to the meridional direction (m), where a mean stagger angle (lambdam) is defined as a mean value of the stagger angle (lambda(i)) of the one of the front blades and the stagger angle (lambda(i+1)) of the one of the rear blades, in accordance with: lambdam=(lambda(i)+lambda(i+1))/2, where at each position on a trailing edge of the one of the front blades (i) an auxiliary coordinate system having a first, a second and a third coordinate direction (s, q, or) is provided, with the first coordinate direction (s) facing downstream at the mean stagger angle (lamdam) relative to the meridional direction (m), the second coordinate direction (q), perpendicular to the first coordinate direction (s), facing away from the pressure side of the one of the front blades (i), and the third coordinate direction (or) being perpendicular to the first coordinate direction (s) and to the second coordinate direction (q), where an effective profile depth (Ieff) is measured as a distance between the leading edge of the one of the front blades (i) and the trailing edge of the one of the rear blades (i+1) parallel to the first coordinate direction (s), where a value of the effective profile depth (Ieff) on the mean meridional flow line is identified as IeffSLM, where a standardized effective profile depth (Ieff) of the one of the front blades and rear blades is defined in accordance with: Ieffn=Ieff/IeffSLM, and where, in an area between the mean meridional flow line (SLM) and one of the two main flow path boundaries (HB), at least one standardized profile depth (In) chosen from a first group including the standardized profile depth (In(i)) of the one of the front blades, and the standardized profile depth (In(i+1)) of the one of the rear blades and the standardized additive profile depth (Iaddn) increases at least locally in a direction of the one of the two main flow path boundaries (HB);

wherein the standardized effective profile depth (Ieffn) in the area between the mean meridional flow line (SLM) and the one of the two main flow path boundaries (HB) is constant within a tolerance between +2% and −2% of a value on the standardized effective profile depth on the mean meridional flow line (IeffnSLM).

2. The blade row group in accordance with claim 1, wherein the at least one standardized profile depth (In) chosen from the first group has a value greater than or equal to 1.1 at the one of the two main flow path boundaries (HB).

3. The blade row group in accordance with claim 1, wherein the at least one standardized profile depth (In) chosen from the first group has a value in a range of 1.15<In<1.20 at the one of the two main flow path boundaries (HB).

4. The blade row group in accordance with claim 1, wherein the at least one standardized profile depth (In) chosen from the first group has a value in a range of 1.2<In<1.3 at the one of the two main flow path boundaries (HB).

5. The blade row group in accordance with claim 1, wherein for the at least one standardized profile depth (In) chosen from the first group, a substantially or exactly constant course in the area between the mean meridional flow line (SLM) and the one of the two main flow path boundaries (HB) is provided along a height of the one of the front blades or the one of the rear blades.

6. The blade row group in accordance with claim 1, wherein for the at least one standardized profile depth (In) chosen from the first group, at a penetration (HE) into the main flow path between the one of the two main flow path boundaries (HB) at 0% relative to the two main flow path boundaries (HB) and the mean meridional flow line (SLM) at 50% relative to the two main flow path boundaries (HB), where the penetration (HE) is at 25% on a quarter meridional flow line (SLQ), only a proportion of the increase is provided relative to the value on the mean meridional flow line (SLM), in accordance with: (In on SLQ)<=((In max)−1)*0.3)+1, where (In max) is a maximum value of the at least one standardized profile depth (In) chosen from the first group.

7. The blade row group in accordance with claim 1, wherein a distribution of the at least one standardized profile depth (In) chosen from the first group, in the area between the mean meridional flow line (SLM) and the one of the two main flow path boundaries (HB) over a penetration (HE) into the main flow path between the one of the two main flow path boundaries (HB) at 0% relative to the two main flow path boundaries (HB) and the mean meridional flow line (SLM) at 50% relative to the two main flow path boundaries (HB) is completely below an upper limit curve (Ino) and completely above a lower limit curve (Inu), where said upper limit curve (Ino) is provided by:

$$Ino=-2E-07(HE)^4+2E-05(HE)^3-0.0004(HE)^2-0.004(HE)+0.3$$

and said lower limit curve (Inu) is provided by:

$$Inu=1E-07(HE)^4-1E-05(HE)^3+0.0007(HE)^2-0.0154(HE)+0.1.$$

8. The blade row group in accordance with claim 1, wherein a distribution of the at least one standardized profile depth (In) chosen from the first group, in the area between the mean meridional flow line (SLM) and the one of the two main flow path boundaries (HB) over a penetration (HE) into the main flow path between the one of the two main flow path boundaries (HB) at 0% relative to the two main flow path boundaries (HB) and the mean meridional flow line (SLM) at 50% relative to the two main flow path boundaries (HB) is defined within a band around a central distribution (Inc), in accordance with:

$$Inc-0.05<In<Inc+0.05,$$

where the following applies:

$$Inc=-1E-08(HE)^4+3E-07(HE)^3+0.0001(HE)^2-0.0105(HE)+0.2.$$

9. The blade row group in accordance with claim 1, wherein the value identified as PVTSLM is in a range of 0.8<PTVSLM<2.0.

10. The blade row group in accordance with claim 1, wherein the relative profile depth ratio (PTVr) in the area between the mean meridional flow line (SLM) and the one of the two main flow path boundaries (HB) decreases at least locally in the direction of the one of the two main flow path boundaries (HB) and assumes at the one of the two main flow path boundaries (HB) a value of less than or equal to 0.85.

11. The blade group in accordance with claim 10, wherein for the at least one standardized profile depth In)_chosen from the first group, with a penetration (HE) into the main flow path between the one of the two main flow path boundaries (HB) at 0% relative to the two main flow path boundaries (HB) and the mean meridional flow line (SLM) at 50% relative to the two main flow path boundaries (HB), where the penetration (HE) is at 25% on the quarter meridional flow line (SLQ), only a proportion of the decrease of the relative profile depth ratio (PTVr) is provided relative to the value on the mean meridional flow line (SLM), in accordance with: (PTVr on SLQ)>=1−(1−(PTVr max.))*0.3), where (PTVr max.) is a maximum value of the relative profile depth ratio (PTVr).

12. The blade row group in accordance with claim 1, wherein at the one of the two main flow path boundaries (HB), a value of the relative profile depth ratio (PTVr) is in a range of 0.8>PTVr>0.6.

13. The blade row group in accordance with claim 1, wherein along a blade height for the relative profile depth ratio (PTVr), a substantially or exactly constant course in the area between the mean meridional flow line (SLM) and the one of the two main flow path boundaries (HB) is provided.

14. The blade row group in accordance with claim 1, wherein the relative profile depth ratio (PTVr) in the area between the mean meridional flow line (SLM) and the one of the two main flow path boundaries (HB), plotted over a penetration (HE) into the main flow path between the one of the two main flow path boundaries (HB) at 0% relative to the two main flow path boundaries (HB) and the mean meridional flow line (SLM) at 50% relative to the two main flow path boundaries (HB) is completely below an upper limit curve (PTVro) and completely above a lower limit curve (PTVru), where said upper limit curve (PTVro) is provided by:

$$PTVro = -8E{-}08(HE)^4 + 1E{-}05(HE)^3 - 0.0007(HE)^2 + 0.0194(HE) + 0.85$$

and said lower limit curve (PTVru) is provided by:

$$PTVru = 2E{-}07(HE)^4 - 2E{-}05(HE)^3 + 0.0006(HE)^2 + 0.0081(HE) + 0.55.$$

15. The blade row group in accordance with claim 1, wherein a distribution of the relative profile depth ratio (PTVr) in the area between the mean meridional flow line (SLM) and the one of the two main flow path boundaries (HB) over a penetration (HE) into the main flow path between the one of the two main flow path boundaries (HB) at 0% relative to the two main flow path boundaries (HB) and the mean meridional flow line (SLM) at 50% relative to the two main flow path boundaries (HB) is defined within a band around a central distribution (PTVrc), in accordance with:

$$PTVrc - 0.05 < PTVr < PTVrc + 0.05,$$

where the following applies:

$$PTVrc = 2E{-}08(HE)^4 + 1E{-}08(HE)^3 - 0.0003(HE)^2 + 0.0165(HE) + 0.7.$$

16. The blade row group in accordance with claim 1, wherein between a front section of the suction side of the one of the rear blades (i+1) and a rear section of the pressure side of the one of the front blades (i), a secondary passage (NP) is provided that guides a local flow.

17. The blade row group in accordance with claim 1, wherein the value identified as PVTSLM is in a range of 1.2<PTVSLM<1.4.

18. The blade row group in accordance with claim 1, wherein at the one of the two main flow path boundaries (HB), a value of the relative profile depth ratio (PTVr) is in a range of 0.6>PTVr>0.55.

* * * * *